United States Defensive Publication [19] (H) [11] T982,003

Hoeschele [43] May 1, 1979

[54] STABILIZED COPOLYETHERESTERS

[75] Inventor: Guenther K. Hoeschele, Wilmington, Del.

[73] Assignee: E. I. Du Pont de Nemours and Company, Wilmington, Del.

[21] Appl. No.: 928,910

[22] Filed: Jul. 28, 1978

[51] Int. Cl.[2] ..... C08K 5/20

[52] U.S. Cl. ..... 260/45.9 NC

[57] ABSTRACT

Thermoplastic copolyetherester elastomers improved by incorporating into the copolyetherester effective concentrations of N,N′-hexamethylenebis(3,5-di-tert-butyl-4-hydroxyhydrocinnamamide) and N,N′-trimethylenebis(3,5-di-tert-butyl-4-hydroxyhydrocinnamamide) to yield non-discoloring compositions having outstanding heat stability and little or no tendency to bloom.

6 Claims, No Sheets Drawing,

15 Pages Specification

The file of this unexamined application may be inspected and copies thereof may be purchased (849 O.G. 1221, Apr. 9, 1968).